3,488,381
PRODUCTION OF PLASTICISER ESTERS

Ronald William Kay, Kirkella, England, assignor to The Distillers Company Limited, Edinburgh, Scotland, a British company
No Drawing. Filed Aug. 17, 1964, Ser. No. 390,174
Claims priority, application Great Britain, Aug. 23, 1963, 33,423/63
Int. Cl. C07c *67/00, 69/80;* C08f *45/40*
U.S. Cl. 260—475                              8 Claims

ABSTRACT OF THE DISCLOSURE

An improved process for the preparation of but-2-en-1,4-diol bis(alkyl phthalate)s, resides in reacting two equivalents of the monoalkyl hydrogen phthalate with a molar equivalent of a 1,4-dihalo-2-butene and two equivalents of an alkali in an inert organic solvent with a catalyst which may be a tertiary amine or a quaternary ammonium salt or a mixture of both. Preferably a solvent is used which forms an azeotrope with the water formed during the reaction.

---

This invention relates to the production of esters, and in particular to the production of but-2-en-1:4-diol bis (alkyl phthalate)s, i.e. compounds of the general formula

where R is alkyl.

But-2-en-1:4-diol bis (butyl phthalate), prepared by the reaction of sodium monobutylphthalate and 1:4-dichlorobutene-2, has previously been described as a plasticizer for use in polyvinyl chloride compositions. It is an object of the present invention to provide an improved process for preparing this and other related compounds.

According to the invention, the process for the production of a but-2-en-1:4-diol bis (alkyl phthalate) comprises heating the corresponding monoalkyl hydrogen phthalate with a 1:4-dihalobutene-2 and an alkali, in substantially inert organic medium, and in the presence of a tertiary amine or a quarternary ammonium salt as an esterification catalyst, or a mixture of both.

It is believed that in the process of the invention, an alkali metal monoalkyl phthalate is formed by the reaction of the alkali with the monoalkyl hydrogen phthalate, and the desired product is formed by elimination of two molecules of alkali metal halide from two molecules of alkali metal monoalkyl phthalate and one molecule of 1:4-dihalobutene-2. Accordingly it is preferred to employ the reactants in proportions such that about two moles of the monoalkyl hydrogen phthalate are present per mole of dihalohydrocarbon, and the alkali is present in substantially stoichiometric amounts. If an excess of any reactant is employed, it can be removed from the product by known methods.

The monoalkyl hydrogen phthalate is conveniently prepared by reacting phthalic anhydride with an alcohol, in proportions sufficient to form the half ester. The alcohol used may be aliphatic, cycloaliphatic, substituted aliphatic, aromatic, or heterocyclic. In the specification and claims the term "alkyl" is defined to cover radicals derived from any of these alcohols. The alcohol may contain, for example, from 1 to 20 carbon atoms in the molecule. Suitable alcohols include methyl, ethyl, propyl, isopropyl, butyl, 2-ethylhexyl and isodecyl alcohols, the so-called oxo-alcohols, the normal primary alcohols such as those prepared by Ziegler-type telomerisation of olefines, unsaturated aliphatic alcohols such as allyl alcohol, cycloaliphatics such as cyclohexanol, aromatic alcohols such as benzyl alcohol and heterocyclics such as tetrahydrofurfuryl alcohol.

The 1:4-dihalobutene-2 will normally be 1:4-dibromobutene-2 or 1:4-dichlorobutene-2, the latter being preferred. The alkali is preferably an alkali metal carbonate such as sodium carbonate. The catalyst is present in an effective quantity suitably up to 0.2 mole per mole of 1:4-dihalobutene-2, for example, from 0.01 to 0.05 mole per mole of 1:4-dihalobutene-2. The reaction is carried out in an inert organic medium. A preferred organic medium is one which is capable of forming a binary azeotrope with water; a suitable organic medium is toluene; a particularly preferred organic medium is xylene. It is particularly preferred that the water of neutralisation is continuously removed from the reaction mixture, suitably as an azeotrope with the organic medium, in order to maintain substantially anhydrous reaction conditions.

The process of the invention may be conveniently carried out by adding the monoalkyl hydrogen phthalate, for example, in the molten state, to a suspension of an alkali metal carbonate in 1:4-dihalobutene-2 and organic diluent medium which also contains the catalyst. The reaction is suitably carried out at a temperature above about 100° C.; it is not normally desirable to allow the temperature of the mixture to rise above about 160° C. at any time during the course of the reaction, and it is preferable to conduct the reaction at about 135° C. The reaction can be carried out at superatmospheric pressure, but it is preferable to work at atmospheric pressure.

The invention is illustrated by the following examples.

EXAMPLE 1

Phthalic anhydride (2.2 moles) was dissolved in n-butanol (2.42 moles) at a temperature which was maintained below 105° C. The liquid half ester produced was added during a period of one hour and twenty eight minutes to a stirred mixture of 1:4-dichlorobutene-2 (1 mole), sodium carbonate (1.21 moles) and trimethylbenzyl ammonium chloride (0.0485 m.) in 350 ml. of xylene. The temperature of the mixture was 120° C. when the addition of the half-ester was commenced and gradually increased at 132° C. The water evolved in the reaction was removed as an azeotrope with xylene. After complete addition of the half-ester, the mixture was refluxed for a further five hours.

Sodium chloride was removed from the product by washing with water and the crude ester was washed with sodium hydroxide and again with water. The excess of xylene was removed by steam stripping in the presence of ten grams of carbon, and the product was vacuum dried at 120 C./100 mm. Hg. The yield of ester was 473 g., equivalent to 95.3% of the theoretical based on 1:4-dichlorobutene-2 fed, and the saponification value was 454 (theoretical 452).

EXAMPLE 2

The procedure of Example 1 was repeated, but isodecyl hydrogen phthalate was substituted for n-butyl hydrogen phthalate. The yield of ester was 92.2% based on 1,4-dichlorobutene-2 fed and the saponification value was 336 (theoretical 339).

EXAMPLE 3

The procedure of Example 1 was repeated but a mixture of n-octanol and n-decanol, sold under the trade name "Alfol 810," was substituted for n-butanol in the preparation of the half-ester. The yield of ester was 95% based on the weight of 1:4-dichlorobutene-2 and the saponification value was 353 (theoretical 357).

EXAMPLE 4

The procedure of Example 1 was repeated, but allyl hydrogen phthalate was substituted for n-butyl hydrogen phthalate. Hydroquinone (0.1 g.) was added to the reaction mixture to prevent polymerisation. The yield of ester was 93% based on the weight of 1:4-dichlorobutene-2 and the saponification value was 482 (theoretical 483).

The following comparative experiment forms no part of the examples illustrative of the present invention. By way of comparison with the process of the invention, the preparation of but-2-en-1:4-diol bis(butyl phthalate) was carried out in n-butanol instead of xylene. The procedure used was similar to that of Example 1. The product of this comparative experiment contained 11% dibutyl phthalate, whereas the product of Example 1 contained less than 1% dibutyl phthalate.

The following examples further illustrate the invention.

EXAMPLE 5

The procedure of Example 1 was repeated with n-butyl hydrogen phthalate, but triethylamine (0.0242 mole) was used as the catalyst. The yield of ester was 94.3% based on the 1:4-dichlorobutene-2 fed, and the saponification value was 451 (theoretical 452).

EXAMPLE 6

The procedure of Example 1 was repeated but benzyl hydrogen phthalate was substituted for n-butyl hydrogen phthalate. The yield of ester was 91.5% based on the 1,4-dichlorobutene-2 fed and the saponification value was 399 (theoretical 398).

I claim:
1. A process for the preparation of a but-2-en-1,4-diol-phthalate ester of formula

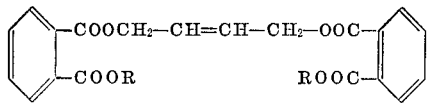

in which R is a straight chain or branched alkyl, alkenyl or cycloalkyl of between 1 and 20 carbon atoms, or aralkyl or tetrahydrofurfuryl, which comprises heating 2 molar equivalents of a monohydrogen phthalate of formula

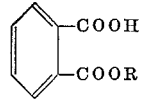

in which R is as defined above, with 1 molar equivalent of 1,4-dichloro-2-butene or 1,4-dibromo-2-butene and about the stoichiometric amount of an alkali metal carbonate in an inert organic medium capable of forming a binary azeotrope with water, in the presence of at least one esterification catalyst selected from the group consisting of tertiary amines and quaternary ammonium salts, continuously removing the water formed during the reaction as an azeotrope with the organic medium 2. A process according to claim 1 in which R of the monoester of phthalic acid is at least one member of the group consisting of butyl, allyl, isodecyl, n-octyl, n-decyl, benzyl, cyclohexyl, and tetrahydrofurfuryl and said monohydrogen alkyl phthalate is gradually added to the mixture of the 1,4-dichloro-2-butene or 1,4-dibromo-2-butene, the alkali, the catalyst in the inert organic medium.

3. A process according to claim 1 in which the inert organic medium comprises xylene.

4. A process according to claim 1 in which the alkali is sodium carbonate.

5. A process according to claim 1 which is carried out at a temperature within the range 100° C. to 160° C.

6. A process according to claim 1 wherein said monoester of phthalic acid is allyl hydrogen phthalate and a polymerization inhibitor is added during the reaction.

7. A process according to claim 1 wherein said catalyst is in the amount of 0.01–0.05 mole per mole of said dichloro- or dibromobutene.

8. A process for the preparation of a but-2-en-1,4-diol phthalate ester according to claim 2, wherein R is allyl, n-octyl, n-decyl and mixtures of n-octyl and n-decyl, wherein said monohydrogen phthalate ester, in which R is as defined hereinabove, is heated at a temperature of about 135° C. with about one mole of 1,4-dichlorobutene-2 and about 1 mole of sodium carbonate in xylene and in the presence of from 0.01 to 0.05 mole of a catalyst selected from the group of tertiary amines, quaternary ammonium salts and mixtures thereof.

References Cited

UNITED STATES PATENTS

| | | | |
|---|---|---|---|
| 2,391,849 | 12/1945 | Taylor | 260—475 |
| 2,501,610 | 3/1950 | Morris et al. | 260—78.4 |
| 3,221,043 | 11/1965 | Fekete et al. | 260—472 |
| 3,318,946 | 5/1967 | Kay | 260—472 |

LORRAINE A. WEINBERGER, Primary Examiner

E. JANE SKELLY, Assistant Examiner

U.S. Cl. X.R.

260—347.4